US012671496B2

(12) United States Patent
Mizumoto et al.

(10) Patent No.: US 12,671,496 B2
(45) Date of Patent: Jun. 30, 2026

(54) FREE-SPACE OPTICAL COMMUNICATION APPARATUS AND METHOD FOR CONTROLLING FREE-SPACE OPTICAL COMMUNICATION APPARATUS

(71) Applicant: NEC Corporation, Tokyo (JP)

(72) Inventors: Hisashi Mizumoto, Tokyo (JP); Masaki Aizono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 233 days.

(21) Appl. No.: 18/504,467

(22) Filed: Nov. 8, 2023

(65) Prior Publication Data

US 2024/0171276 A1 May 23, 2024

(30) Foreign Application Priority Data

Nov. 18, 2022 (JP) ................................. 2022-185248

(51) Int. Cl.
  *H04B 10/11* (2013.01)
  *H04B 10/071* (2013.01)
  *H04B 10/112* (2013.01)
  *H04B 10/40* (2013.01)

(52) U.S. Cl.
  CPC ....... *H04B 10/1123* (2013.01); *H04B 10/071* (2013.01); *H04B 10/11* (2013.01); *H04B 10/40* (2013.01)

(58) Field of Classification Search
  CPC .. H04B 10/1123; H04B 10/071; H04B 10/11; H04B 10/40
  USPC .................................. 398/118–131, 135–139
  See application file for complete search history.

(56) References Cited

U.S. PATENT DOCUMENTS

| | | | | |
|---|---|---|---|---|
| 2011/0304842 | A1* | 12/2011 | Kao | G01S 7/4918 |
| | | | | 356/5.01 |
| 2015/0023668 | A1* | 1/2015 | Spaulding | H04B 10/1129 |
| | | | | 398/118 |
| 2016/0238833 | A1 | 8/2016 | Okumura | |
| 2016/0282449 | A1* | 9/2016 | Slobodyanyuk | G01S 7/0235 |
| 2016/0327648 | A1* | 11/2016 | Lipson | G01S 17/74 |
| 2018/0136643 | A1* | 5/2018 | Tao | G05D 1/0231 |
| 2018/0188358 | A1* | 7/2018 | Li | G01S 7/4865 |
| 2018/0196139 | A1* | 7/2018 | Brown | G01S 17/10 |
| 2019/0369254 | A1* | 12/2019 | Dumais | G02F 1/292 |

(Continued)

FOREIGN PATENT DOCUMENTS

| | | |
|---|---|---|
| JP | WO2015/049866 A1 | 3/2017 |
| JP | WO2018/056199 A1 | 6/2019 |
| JP | 2021-516396 A | 7/2021 |

*Primary Examiner* — Dibson J Sanchez
(74) *Attorney, Agent, or Firm* — Sughrue Mion, P.LLC.

(57) ABSTRACT

A free-space optical communication apparatus includes: a light emission section; an optical phase modulation section; a light reception section; and at least one processor, the at least one processor carrying out: a communication control process of, by causing the light emission section to emit first communication light and causing the light reception section to receive second communication light from a communication counterpart, carrying out free-space optical communication with the communication counterpart; and a measurement control process of measuring a distance to a surrounding object by causing the light emission section to emit pulsed light and causing the light reception section to receive reflected light of the pulsed light.

7 Claims, 5 Drawing Sheets

(56) References Cited

U.S. PATENT DOCUMENTS

| 2020/0025882 | A1  |  1/2020 | Watanabe et al. |              |
| 2020/0366369 | A1* | 11/2020 | Kyosuna        | H04B 10/112  |
| 2021/0006332 | A1* |  1/2021 | Pandit         | H04B 10/11   |
| 2021/0086764 | A1  |  3/2021 | Zhang et al.   |              |
| 2021/0116547 | A1* |  4/2021 | Lu             | G01S 7/4914  |
| 2022/0413096 | A1* | 12/2022 | Entwistle      | G01S 17/86   |
| 2023/0305115 | A1* |  9/2023 | Zhou           | H03M 7/3068  |

* cited by examiner

FREE-SPACE OPTICAL COMMUNICATION APPARATUS AND METHOD FOR CONTROLLING FREE-SPACE OPTICAL COMMUNICATION APPARATUS

This Nonprovisional application claims priority under 35 U.S.C. § 119 on Patent Application No. 2022-185248 filed in Japan on Nov. 18, 2022, the entire contents of which are hereby incorporated by reference.

TECHNICAL FIELD

The present invention relates to a free-space optical communication apparatus and a method for controlling a free-space optical communication apparatus.

BACKGROUND ART

In recent years, various apparatuses have been provided with sensors and communication apparatuses and have performed advanced control based on sensing results and communication results. For example, in a self-drive vehicle, a safe distance is secured through, for example, a prediction made about movement of a counterpart vehicle by (i) estimating, for example, the positions and attitudes of the self-drive vehicle and of the counterpart vehicle with combined use of, for example, a distance measurement apparatus, such as a global navigation satellite system (GNSS), a camera, and a light detection and ranging (LIDAR), and an internal field sensor for measuring an attitude angle and (ii) sharing the information with other vehicles and the like with use of a communication apparatus. Patent Literature 1 describes a vehicle that is provided with a sensor such as an infrared sensor, a laser sensor, and an ultrasonic sensor and a communication apparatus such as a Bluetooth (registered trademark) module.

CITATION LIST

Patent Literature

[Patent Literature 1]
Published Japanese Translation of PCT International Application Tokuhyo No. 2021-516396

SUMMARY OF INVENTION

Technical Problem

However, advanced processing carried out for sensing and communication with combined use of a plurality of apparatuses as in Patent Literature 1 may cause an increase in cost and a decrease in energy efficiency for computation. Therefore, a technique capable of carrying out sensing and communication with a simple configuration is beneficial.

The present disclosure has been made in view of the above problems, and an example of the object of the present disclosure is to provide a technique capable of carrying out sensing and communication with a simple configuration.

Solution to Problem

A free-space optical communication apparatus in accordance with an example aspect of the present disclosure includes: a light emission section configured to emit light; an optical phase modulation section configured to adjust a direction of the light emitted by the light emission section;

a light reception section configured to receive light from outside; and at least one processor, the at least one processor carrying out: a communication control process of, by causing the light emission section to emit first communication light and causing the light reception section to receive second communication light from a communication counterpart, carrying out free-space optical communication with the communication counterpart; and a measurement control process of measuring a distance to a surrounding object by causing the light emission section to emit pulsed light and causing the light reception section to receive reflected light of the pulsed light.

A method a free-space optical for controlling communication apparatus in accordance with an example aspect of the present disclosure is a method for controlling a free-space optical communication apparatus, the free-space optical communication apparatus including: a light emission section configured to emit light; an optical phase modulation section configured to adjust a direction of the light emitted by the light emission section; and a light reception section configured to receive light from outside, the free-space optical communication apparatus carrying out: a communication control process of, by causing the light emission section to emit first communication light and causing the light reception section to receive second communication light from a communication counterpart, carrying out free-space optical communication with the communication counterpart; and a measurement control process of measuring a distance to a surrounding object by causing the light emission section to emit pulsed light and causing the light reception section to receive reflected light of the pulsed light.

Advantageous Effects of Invention

An example aspect of the present disclosure brings about an example effect of making it possible to provide a technique of carrying out sensing and communication with a simple configuration.

DESCRIPTION OF EMBODIMENTS

Figure 1:
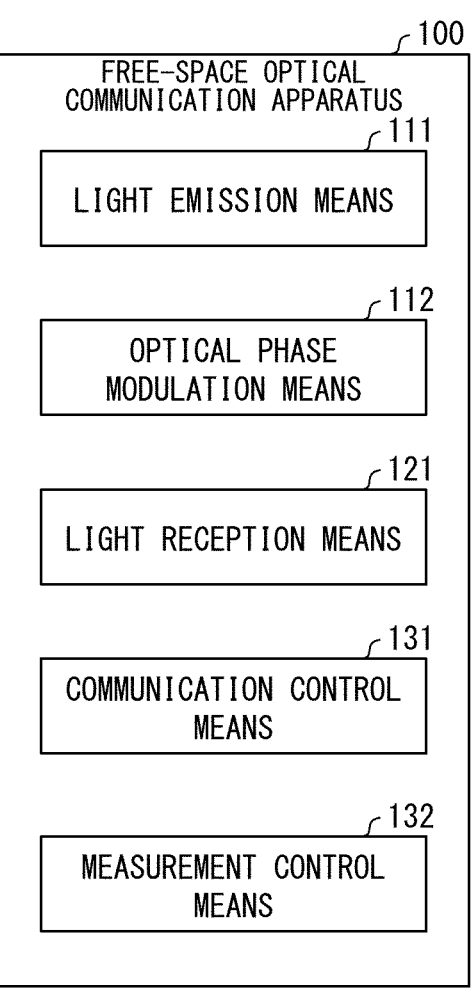
FIG. 1 is a block diagram illustrating an example of a schematic configuration of a free-space optical communication apparatus in accordance with the present disclosure.

The following will exemplify embodiments of the present invention. However, the present invention is not limited to example embodiments described below, but may be altered in various ways by a skilled person within the scope of the claims. For example, the present invention can also encompass, in the scope of the present invention, any example embodiment derived by appropriately combining technical means employed in the example embodiments described below. Further, the present invention can also encompass, in the scope of the present invention, any example embodiment derived by appropriately omitting part of technical means employed in the example embodiments described below. Further, the effects mentioned in the example embodiments described below are examples of the effects expected in the example embodiments described below, and are not intended to define an extension of the present invention. That is, the present invention can also encompass, in the scope of the present invention, any example embodiments that do not bring about the effects mentioned in the example embodiments described below.

First Example Embodiment

A first example embodiment which is an example of an embodiment of the present invention will be described in detail with reference to the drawings. The present example embodiment is a basic form of each example embodiment described later. Note that the scope of the application of each technical means employed in the present example embodiment is not limited to the present example embodiment. That is, each technical means employed in the present example embodiment can also be employed in other example embodiments included in the present disclosure to the extent that no particular technical obstruction occurs. In addition, each technical means illustrated in the drawings which are referred to for the description of the present example embodiment can also be employed in other example embodiments included in the present disclosure to the extent that no particular technical obstruction occurs.

(Configuration of Free-Space Optical Communication Apparatus)

A configuration of a free-space optical communication apparatus 100 in accordance with the present example embodiment will be described with reference to FIG. 1. FIG. 1 is a block diagram illustrating the configuration of the free-space optical communication apparatus 100. The free-space optical communication apparatus 100 is a communication apparatus that carries out free-space optical communication. The free-space optical communication is communication that is carried out with use of light propagating through space. Examples of the light used in the free-space optical communication can include a millimeter wave, a submillimeter wave, infrared light, visible light, and ultraviolet light.

The free-space optical communication apparatus 100 includes a light emission means 111, an optical phase modulation means 112, a light reception means 121, a communication control means 131, and a measurement control means 132.

The light emission means 111 emits light. The light emission means 111 can emit communication light (first communication light) for free-space optical communication and pulsed light for distance measurement. The communication light is continuous light on which a digital signal including a communication content is superimposed. The pulsed light has an intensity higher than that of the communication light and is instantaneously emitted. The light emission means 111 includes a light emitting element and can include a lens and the like. Light emission of the light emission means 111 is controlled by the communication control means 131 and the measurement control means 132. Light emitted from the light emission means 111 enters the optical phase modulation means 112.

The optical phase modulation means 112 adjusts a direction of the light emitted by the light emission means 111. The optical phase modulation means 112 is controlled by the communication control means 131 and the measurement control means 132.

The optical phase modulation means 112 is realized by, for example, a ferroelectric liquid crystal, a homogeneous liquid crystal, a vertically aligned liquid crystal, or the like, and includes, as an example, a liquid crystal on silicon (LCOS) device. The optical phase modulation means 112 has a plurality of light reception regions which the light emitted from the light emission means 111 enters, and is configured to cause Fraunhofer diffraction. The communication control means 131 and the measurement control means 132 can control the refractive index of each of the light reception regions by controlling a voltage applied to each of the light reception regions. Thus, the communication control means 131 and the measurement control means 132 can generate a difference in the refractive index between the light reception regions to appropriately diffract light which has entered the optical phase modulation means 112 from the light emission means 111. Thus, the optical phase modulation means 112 can adjust the direction of the light emitted by the light emission means 111. In addition, the optical phase modulation means 112 can divide the light emitted by the light emission means 111 into a plurality of light beams and emit the light beams in mutually different directions.

The light reception means 121 receives light from outside. The light reception means 121 can receive, as the light from outside, communication light (second communication light) from a communication counterpart in the free-space optical communication of the free-space optical communication apparatus 100 and reflected light of pulsed light emitted by the free-space optical communication apparatus 100. The light reception means 121 includes a light receiving element and a reception circuit, and can include a condenser lens and the like.

The communication control means 131 causes the light emission means 111 to emit first communication light and causes the light reception means 121 to receive second communication light from the communication counterpart, so that free-space optical communication is carried out with a communication counterpart. That is, the communication control means 131 controls the light emission means 111 to emit the first communication light on which a digital signal including a communication content to be transmitted to the communication counterpart is superimposed, so that a desired communication content is transmitted to the communication counterpart. Further, the communication control means 131 controls the light reception means 121 to receive the second communication light on which a digital signal including a communication content transmitted from the communication counterpart is superimposed, so that the communication content transmitted from the communication counterpart is acquired.

The measurement control means 132 causes the light emission means 111 to emit pulsed light and causes the light reception means 121 to receive reflected light of the pulsed light, so that a distance to a surrounding object is measured. That is, the measurement control means 132 controls the light emission means 111 to emit the pulsed light. The emitted pulsed light is reflected off the surrounding object. The measurement control means 132 causes the light reception means 121 to receive the reflected light of the pulsed light, so that the distance to the surrounding object can be measured on the basis of the received reflected light.

As described above, the free-space optical communication apparatus 100 in accordance with the present example embodiment can carry out not only free-space optical communication but also measurement using pulsed light with use of the light emission means 111, the optical phase modulation means 112, and the light reception means 121. Thus, an effect that sensing and communication can be carried out with a simple configuration is obtained.

(Flow of Method for Controlling Free-Space Optical Communication Apparatus)

A flow of a method for controlling a free-space optical communication apparatus in accordance with the present example embodiment will be described with reference to FIGS. 2 and 3. In the method for controlling the free-space optical communication apparatus in accordance with the present example embodiment, a communication control process and a measurement control process are carried out.

Figure 2:
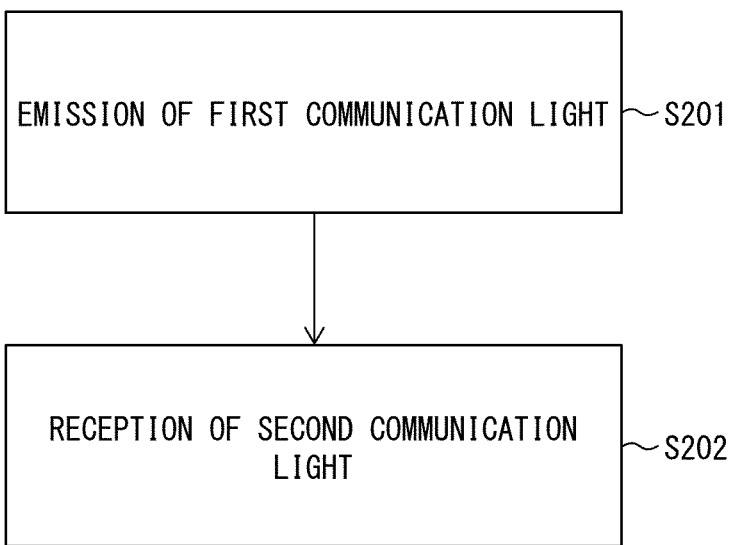
FIG. 2 is a flowchart illustrating an example of a communication control process carried out by the free-space optical communication apparatus in accordance with the present disclosure.

FIG. 2 is a flowchart illustrating an example of a communication control process carried out by the free-space optical communication apparatus 100. In step S201, the communication control means 131 causes the light emission means 111 to emit first communication light. In step S202, the communication control means 131 causes the light reception means 121 to receive second communication light from a communication counterpart. Thus, the communication control means 131 enables the free-space optical communication apparatus 100 to carry out free-space optical communication with the communication counterpart.

Figure 3:
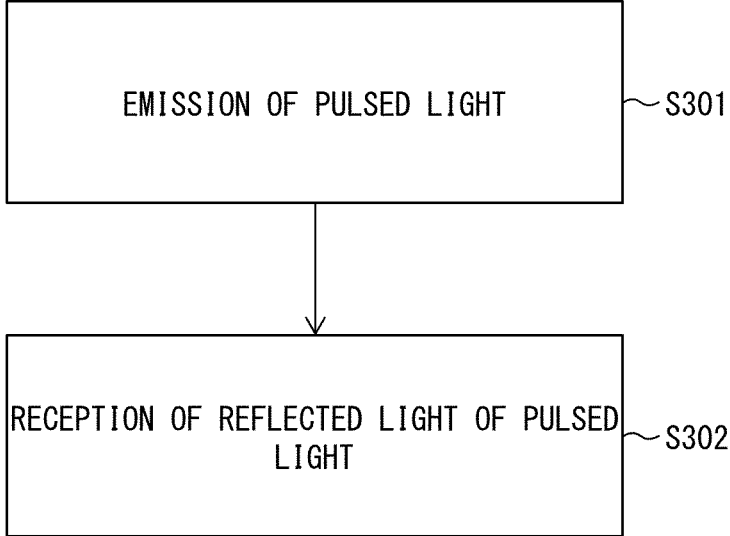
FIG. 3 is a flowchart illustrating an example of a measurement control process carried out by the free-space optical communication apparatus in accordance with the present disclosure.

FIG. 3 is a flowchart illustrating an example of a measurement control process carried out by the free-space optical communication apparatus 100. In step S301, the measurement control means 132 causes the light emission means 111 to emit pulsed light. In step S302, the measurement control means 132 causes the light reception means 121 to receive reflected light of the pulsed light. Thus, the measurement control means 132 enables the free-space optical communication apparatus 100 to measure a distance to a surrounding object.

As described above, the method for controlling the free-space optical communication apparatus in accordance with the present example embodiment enables the free-space optical communication apparatus to carry out not only free-space optical communication but also measurement using pulsed light. Thus, an effect that sensing and communication can be carried out with a simple configuration is obtained.

Second Example Embodiment

A second example embodiment which is an example of an embodiment of the present invention will be described in detail with reference to the drawings. The same reference numerals are given to constituent elements which have functions identical with those described in the above-described example embodiment, and descriptions as to such constituent elements are omitted as appropriate. Note that the scope of the application of the technical means employed in the present example embodiment is not limited to the present example embodiment. That is, each technical means employed in the present example embodiment can also be employed in other example embodiments included in the present disclosure to the extent that no particular technical obstruction occurs. In addition, each technical means illustrated in the drawings which are referred to for the description of the present example embodiment can also be employed in other example embodiments included in the present disclosure to the extent that no particular technical obstruction occurs.

Figure 4:
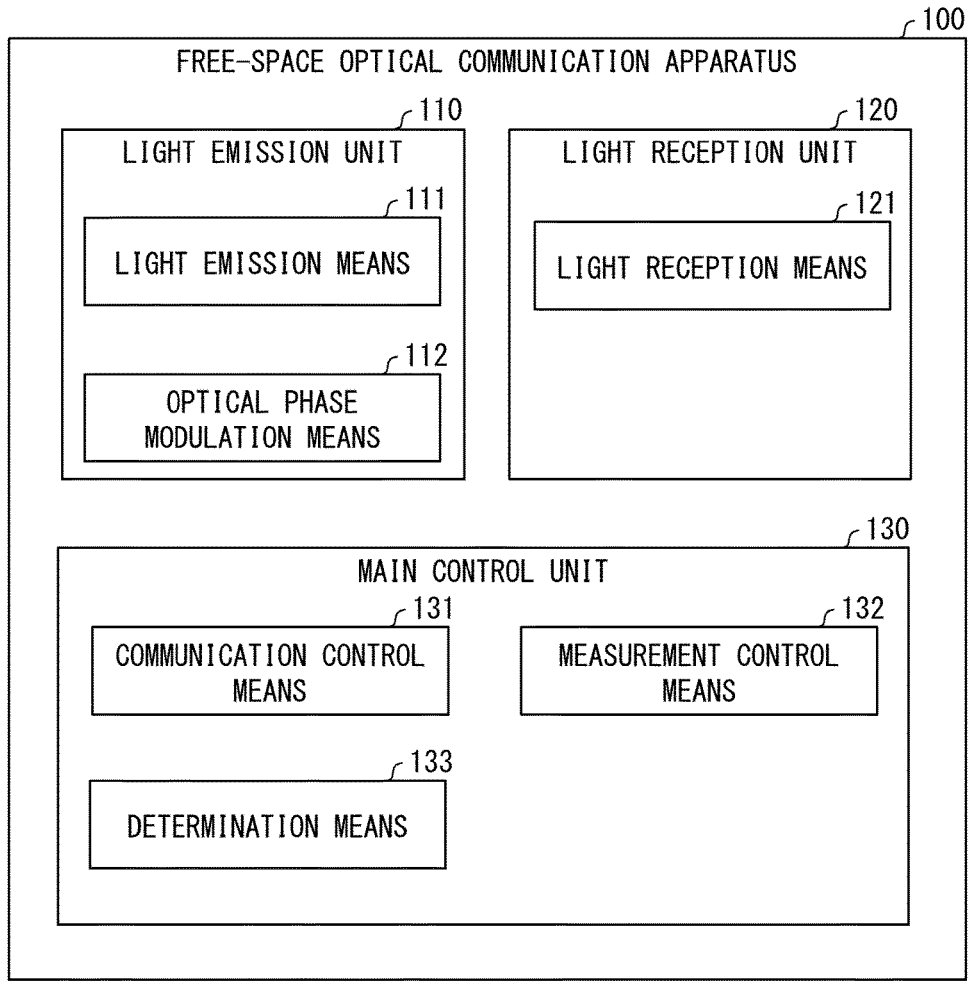
FIG. 4 is a block diagram illustrating an example of a schematic configuration of a free-space optical communication apparatus in accordance with the present disclosure.

FIG. 4 is a block diagram illustrating a configuration of a free-space optical communication apparatus 100 in accordance with the present example embodiment. The free-space optical communication apparatus 100 includes a light emission unit 110, a light reception unit 120, and a main control unit 130. The light emission unit 110 includes a light emission means 111 and an optical phase modulation means 112. The light reception unit 120 includes a light reception means 121. The main control unit 130 includes a communication control means 131, a measurement control means 132, and a determination means 133. The determination means 133 determines whether light from outside is second communication light or reflected light of pulsed light.

Figure 5:
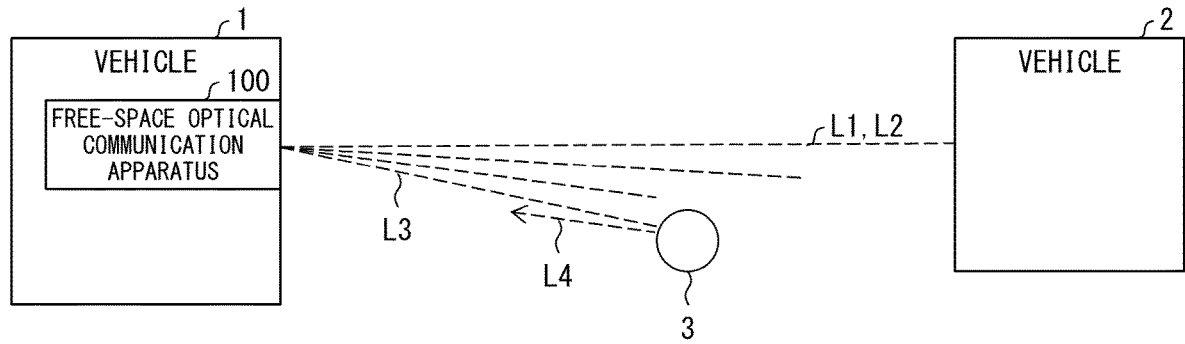
FIG. 5 is a schematic diagram illustrating an application example of the free-space optical communication apparatus in accordance with the present disclosure.

FIG. 5 is a schematic diagram illustrating an application example of a free-space optical communication apparatus 100 in accordance with the present example embodiment. In the application example illustrated in FIG. 5, the free-space optical communication apparatus 100 is provided in a vehicle 1. The free-space optical communication apparatus 100 carries out free-space optical communication with a vehicle 2 (communication counterpart) through first communication light L1 which is directed to the vehicle 2 from the free-space optical communication apparatus 100 and second communication light L2 which is directed to the free-space optical communication apparatus 100 from the vehicle 2. Further, the free-space optical communication apparatus 100 measures a distance to a surrounding object 3 by emitting pulsed light L3 toward the surroundings and receiving reflected light L4 of the pulsed light reflected off the surrounding object 3.

Figure 6:
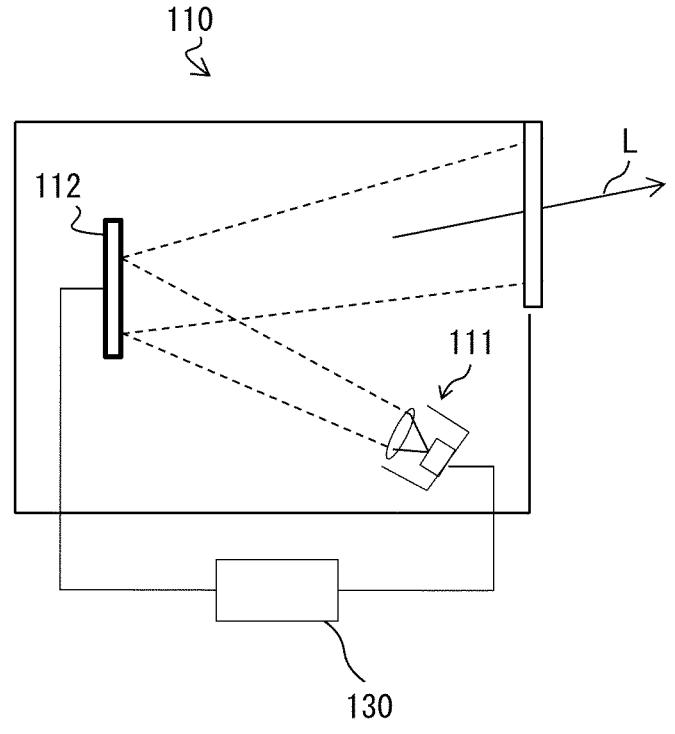
FIG. 6 is a schematic diagram illustrating an example of a configuration of a light emission unit of the free-space optical communication apparatus in accordance with the present disclosure.

FIG. 6 is a schematic diagram illustrating a configuration example of the light emission unit 110. As illustrated in FIG. 6, light L emitted from the light emission means 111 enters the optical phase modulation means 112, the direction of the light L is adjusted by the optical phase modulation means 112, and the light is emitted from the light emission unit 110. The light emission means 111 and the optical phase modulation means 112 are controlled by the communication control means 131 and the measurement control means 132 of the main control unit 130.

Note that the light emission means 111 may include a light source that emits the first communication light L1 and a light source that emits the pulsed light L3. Thus, it is possible to emit light suitable as the first communication light L1 and light suitable as the pulsed light L3.

Figure 7:
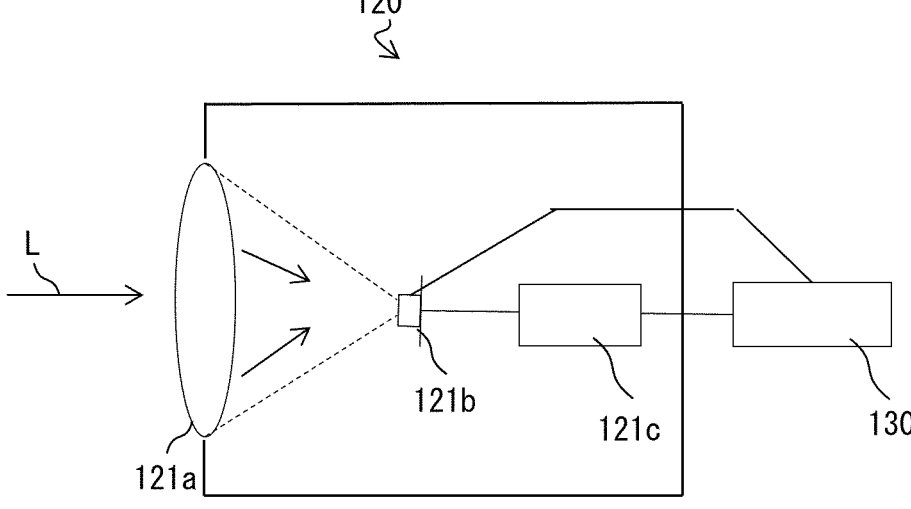
FIG. 7 is a schematic diagram illustrating an example of a configuration of a light reception unit of the free-space optical communication apparatus in accordance with the present disclosure.

FIG. 7 is a schematic diagram illustrating a configuration example of the light reception unit 120. As illustrated in FIG. 7, the light reception means 121 includes a condenser lens 121*a*, a light receiving element 121*b*, and a reception circuit 121*c*. Light L from outside is condensed by the condenser lens 121*a* and received by the light receiving element 121*b*. Then, the reception circuit 121*c* detects the light L received by the light receiving element 121*b*. A result of the detection carried out by the reception circuit 121*c* is provided to the communication control means 131, the measurement control means 132, and the determination means 133 of the main control unit 130.

(Regarding Operation of Determination Means)

The light reception means 121 receives both the second communication light L2 from the communication counterpart and the reflected light L4 of the pulsed light L3. Thus, the free-space optical communication apparatus 100 includes the determination means 133 that determines whether the light received by the light reception means 121 is the second communication light L2 or the reflected light L4.

A determination method carried out by the determination means 133 is not particularly limited, provided that the determination method enables distinguishing between the second communication light L2 and the reflected light L4. For example, the following method can be used.

As described above, the pulsed light L3 is very strong and instantaneous light as compared to the communication light L1 and the communication light L2. Thus, the reflected light L4 also has an intensity higher than that of the second communication light L2. Therefore, in an example aspect, the determination means 133 can determine whether light received by the light reception means 121 is the second communication light L2 or the reflected light L4 on the basis of the light intensity of the light received by the light reception means 121.

Further, in an example aspect, the measurement control means 132 may make the frequency of the pulsed light L3 different from the frequency of the second communication light. This enables the determination means 133 to determine whether the light received by the light reception means 121 is the second communication light L2 or the reflected light L4 on the basis of the frequency of the light received by the light reception means 121.

Further, in an example aspect, the communication control means 131 and the measurement control means 132 may make the modulation method of the communication light different from the modulation method of the pulsed light L3. This enables the determination means 133 to determine whether the light received by the light reception means 121 is the second communication light L2 or the reflected light L4 on the basis of the modulation method of the light received by the light reception means 121.

Further, in an example aspect, the communication control means 131 and the measurement control means 132 may separate a timing for carrying out free-space optical communication from a timing for carrying out measurement using the pulsed light L3. This enables the determination means 133 to determine whether the light received by the light reception means 121 is the second communication light L2 or the reflected light L4 on the basis of the timing of the light received by the light reception means 121.

Further, the determination means 133 may use the above-described methods in combination.

(Regarding Measurement of Communication Counterpart)

A target that is subjected to the measurement using the pulsed light L3 may be any surrounding object, and, in an example aspect, may be a communication counterpart of the free-space optical communication apparatus 100. For example, as in the example illustrated in FIG. 5, the distance to another vehicle 2, which is the communication counterpart of the free-space optical communication apparatus 100, may be measured. This makes it possible to acquire positional information of the vehicle 2 and makes it possible to secure a safe distance through, for example, prediction or the like of movement of the vehicle 2.

Further, the free-space optical communication apparatus 100 can measure not only a distance to a communication counterpart but also an attitude of the communication counterpart. This makes it possible to further acquire information about the communication counterpart. A method by which the free-space optical communication apparatus 100 measures the attitude of the communication counterpart is as follows.

First, optical axis alignment in free-space optical communication will be described. In order to carry out free-space optical communication, the free-space optical communication apparatus 100 carries out optical axis alignment with a free-space optical communication apparatus which is a communication counterpart. The optical axis alignment for free-space optical communication refers to aligning the optical axis of the light emission unit 110 and the light reception unit 120 in one free-space optical communication apparatus with the optical axis of the light emission unit 110 and the light reception unit 120 in another free-space optical communication apparatus.

Figure 8:
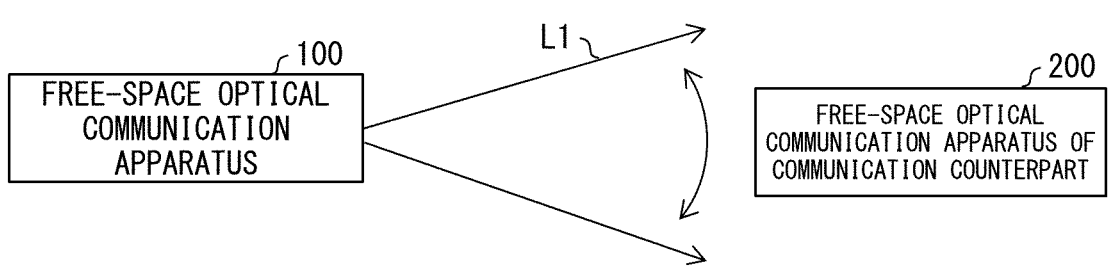
FIG. 8 is an explanatory diagram of an example of optical axis alignment carried out by the free-space optical communication apparatus.
Figure 9:
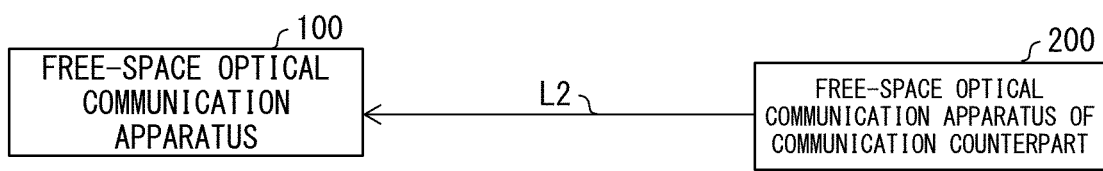
FIG. 9 is an explanatory diagram of an example of optical axis alignment carried out by the free-space optical communication apparatus.

FIGS. 8 and 9 are each explanatory diagrams of an example of optical axis alignment carried out by free-space optical communication apparatuses. In the following description, as an example, a process flow in which the free-space optical communication apparatus 100 carries out scanning to carry out optical axis alignment with a free-space optical communication apparatus 200 of a communication counterpart will be described. The optical axis alignment between any free-space optical communication apparatuses can also be carried out in the same manner. Note that "scanning" may be restated as "search". Further, the optical axis alignment of the free-space optical communication apparatus 100 is controlled by the communication control means 131.

The communication control means 131 causes the light emission means 111 to emit the first communication light L1 and causes the optical phase modulation means 112 to change a first light emission direction of the first communication light L1 (scanning). Then, the first communication light L1 emitted from the free-space optical communication apparatus 100 in a correct direction is received by the free-space optical communication apparatus 200.

The first communication light L1 contains identification information that identifies the free-space optical communication apparatus 100 and direction information (azimuth angle, elevation angle, and depression angle) that indicates the direction in which the first communication light L1 is sent out.

In a case where the free-space optical communication apparatus 200 successfully receives the first communication light L1, that is, the optical axes of the free-space optical communication apparatuses 100 and 200 coincide with each other, the free-space optical communication apparatus 200 acquires the identification information and the direction information that are contained in the first communication light L1 and identifies the direction of the free-space optical communication apparatus 100. Further, the free-space optical communication apparatus 200 may identify the distance to the free-space optical communication apparatus 100 in accordance with the attenuation of the first communication light L1. This enables the free-space optical communication apparatus 200 to identify the relative position of the free-space optical communication apparatus 100.

As illustrated in FIG. 9, the free-space optical communication apparatus 200 emits the second communication light L2 toward the free-space optical communication apparatus 100. The second communication light L2 contains identification information that identifies the free-space optical communication apparatus 200; direction information acquired from the first communication light L1; and distance information that indicates the distance to the free-space optical communication apparatus 100 identified by the free-space optical communication apparatus 200. When the light reception means 121 receives the second communication light L2, the communication control means 131 can acquire the identification information, the direction information, and the distance information contained in the second communication light L2, identify the direction of the free-space optical communication apparatus 200 and the distance to the free-space optical communication apparatus 200, and identify the relative position of the free-space optical communication apparatus 200. Thus, the optical axis alignment is completed.

This enables the communication control means 131 to detect a light emission direction (first light emission direction) in which free-space optical communication is possible with the free-space optical communication apparatus 200 (communication counterpart). Further, in a case where information indicative of the direction (second light emission direction) of the second communication light L2 from the free-space optical communication apparatus 200 (communication counterpart) is superimposed on the second communication light L2, the communication control means 131 can measure the attitude of the free-space optical communication apparatus 200 (communication counterpart) on the basis of the first light emission direction and the second light emission direction.

Further, the free-space optical communication apparatus 100 can emit light beams with any shape simultaneously in a plurality of directions by virtue of the optical phase modulation means 112. Thus, for example, communication can be established by measuring the distance to the communication counterpart, identifying the position of the communication counterpart, and emitting the first communication light toward the communication counterpart.

Further, the free-space optical communication apparatuses can share the attitude information by transmitting, to each other, their respective communication light beams carrying their respective pieces of information on the light emission direction at the time of optical axis alignment between the free-space optical communication apparatuses.

[Software Implementation Example]

Some or all of functions of the free-space optical communication apparatus 100 can be realized by hardware such as an integrated circuit (IC chip) or can be alternatively realized by software.

Figure 10:
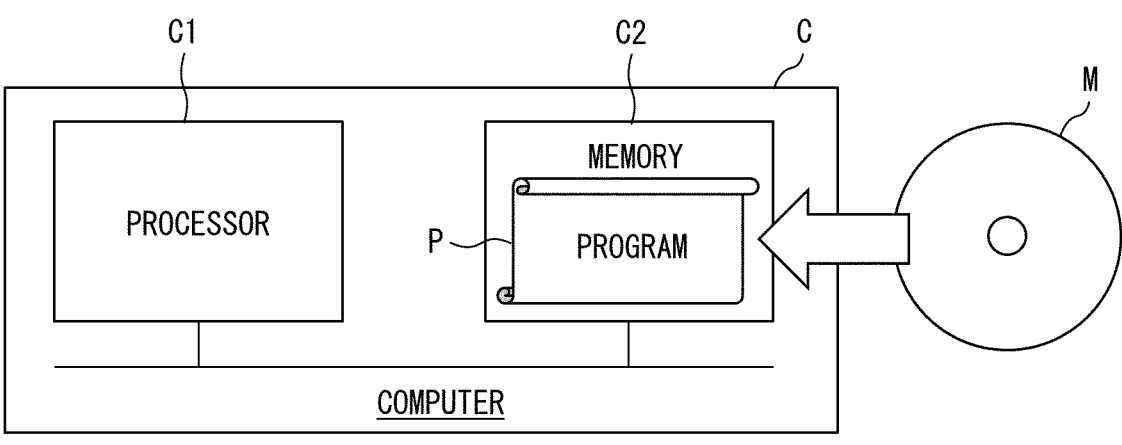
FIG. 10 is a schematic diagram illustrating an example of a configuration of a computer.

In the latter case, the free-space optical communication apparatus 100 is realized by, for example, a computer that executes instructions of a program that is software realizing the foregoing functions. FIG. 10 illustrates an example of such a computer (hereinafter, referred to as "computer C"). The computer C includes at least one processor C1 and at least one memory C2. The at least one memory C2 stores a program P for causing the computer C to operate as the free-space optical communication apparatus 100. In the computer C, the processor C1 reads the program P from the memory C2 and executes the program P, so that the functions of the free-space optical communication apparatus 100 are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, or a combination of these. As the memory C2, for example, it is possible to use a flash memory, a hard disk drive (HDD), a solid state drive (SSD), or a combination of these.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

[Additional Remark 1]

The present disclosure includes the techniques described in the supplementary notes below. Note, however, that the present invention is not limited to the techniques described in the supplementary notes below, but may be altered in various ways by a skilled person within the scope of the claims.

(Supplementary Note 1)

A free-space optical communication apparatus including: a light emission means for emitting light; an optical phase modulation means for adjusting a direction of the light emitted by the light emission means; a light reception means for receiving light from outside; a communication control means for, by causing the light emission means to emit first communication light and causing the light reception means to receive second communication light from a communication counterpart, carrying out free-space optical communication with the communication counterpart; and a measurement control means for measuring a distance to a surrounding object by causing the light emission means to emit pulsed light and causing the light reception means to receive reflected light of the pulsed light.

(Supplementary Note 2)

The free-space optical communication apparatus described in supplementary note 1, wherein the pulsed light has a light t intensity higher than that of the second communication light, and the free-space optical communication apparatus further includes a determination means for determining whether the light received by the light reception means is the second communication light or reflected light of the pulsed light on the basis of the light intensity of the light received by the light reception means.

(Supplementary Note 3)

The free-space optical communication apparatus described in supplementary note 1, wherein the pulsed light differs in frequency or modulation method from the second communication light, and the free-space optical communication apparatus further includes a determination means for determining whether the light received by the light reception means is the second communication light or reflected light of the pulsed light on the basis of the frequency of the light received by the light reception means or the modulation method thereof.

(Supplementary Note 4)

The free-space optical communication apparatus described in supplementary note 1, wherein the measurement control means measures a distance to the communication counterpart.

(Supplementary Note 5)

The free-space optical communication apparatus described in supplementary note 1, wherein the communication control means, by causing the optical phase modulation means to change a first light emission direction of the first communication light, detects the first light emission direction in which free-space optical communication is possible with the communication counterpart.

(Supplementary Note 6)

The free-space optical communication apparatus described in supplementary note 5, wherein information indicative of a second light emission direction of the second communication light from the communication counterpart is superimposed on the second communication light, and the measurement control means measures an attitude of the communication counterpart on a basis of the first light emission direction and the second light emission direction.

(Supplementary Note 7)

The free-space optical communication apparatus described in supplementary note 1, wherein the light emission means includes a light source that emits the first communication light and a light source that emits the pulsed light.

(Supplementary Note 8)

A vehicle including a free-space optical communication apparatus described in any one of supplementary notes 1 to 7.

(Supplementary Note 9)

A method for controlling a free-space optical communication apparatus, the free-space optical communication apparatus including: a light emission means for emitting light; an optical phase modulation means for adjusting a direction of the light emitted by the light emission means; and a light reception means for receiving light from outside, the free-space optical communication apparatus carrying out: a communication control process of, by causing the light emission means to emit first communication light and causing the light reception means to receive second communication light from a communication counterpart, carrying out free-space optical communication with the communication counterpart; and a measurement control process of measuring a distance to a surrounding object by causing the light emission means to emit pulsed light and causing the light reception means to receive reflected light of the pulsed light.

(Supplementary Note 10)

A control program for causing a computer to operate as a free-space optical communication apparatus described in any one of supplementary notes 1 to 8, the program causing the computer to function as each of the means.

(Supplementary Note 11)

A free-space optical communication apparatus including: a light emission means for emitting light; an optical phase modulation means for adjusting a direction of the light emitted by the light emission means; a light reception means for receiving light from outside; and at least one processor, the at least one processor carrying out: a communication control process of, by causing the light emission means to emit first communication light and causing the light reception means to receive second communication light from a communication counterpart, carrying out free-space optical communication with the communication counterpart; and a measurement control process of measuring a distance to a surrounding object by causing the light emission means to emit pulsed light and causing the light reception means to receive reflected light of the pulsed light.

Note that the free-space optical communication apparatus can further include a memory. The memory can store a program causing the processor to execute the communication control process and the measurement control process. The program can be stored in a computer-readable non-transitory tangible storage medium.

REFERENCE SIGNS LIST

1: vehicle
100: free-space optical communication apparatus
111: light emission means
112: optical phase modulation means
121: light reception means
131: communication control means
132: measurement control means
133: determination means

The invention claimed is:

1. A free-space optical communication apparatus comprising:

a light emission section configured to emit light;

an optical phase modulation section configured to adjust a direction of the light emitted by the light emission section;

a light reception section configured to receive light from outside; and at least one processor, the at least one processor being configured to carry out:

a communication control process comprising, by causing the light emission section to emit first communication light and causing the light reception section to receive second communication light from a communication counterpart, carrying out free-space optical communication with the communication counterpart;

a measurement control process comprising measuring a distance to a surrounding object by causing the light emission section to emit pulsed light and causing the light reception section to receive reflected light of the pulsed light, wherein the at least one processor is configured to, in the communication control process, by causing the optical phase modulation section to change a first light emission direction of the first communication light, detect the first light emission direction in which free-space optical communication is possible with the communication counterpart, wherein information indicative of a second light emission direction of the second communication light from the communication counterpart is superimposed on the second communication light, and wherein in the measurement control process, the at least one processor measures an attitude of the communication counterpart on a basis of the first light emission direction and the second light emission direction.

2. The free-space optical communication apparatus according to claim 1, wherein:

the pulsed light has a light intensity higher than that of the second communication light, and the at least one processor is configured to carry out a determination process comprising determining whether the light received by the light reception section is the second communication light or the reflected light of the pulsed light on the basis of the light intensity of the light received by the light reception section.

3. The free-space optical communication apparatus according to claim 1, wherein:

the pulsed light differs in frequency or modulation method from the second communication light, and the at least one processor is configured to carry out a determination process comprising determining whether the light received by the light reception section is the second communication light or the reflected light of the pulsed light on the basis of the frequency of the light received by the light reception section or the modulation method thereof.

4. The free-space optical communication apparatus according to claim 1, wherein the at least one processor is configured to, in the measurement control process, measure a distance to the communication counterpart.

5. The free-space optical communication apparatus according to claim 1, wherein the light emission section includes a light source configured to emit the first communication light and a light source configured to emit the pulsed light.

6. A vehicle comprising a free-space optical communication apparatus according to claim 1.

7. A method for controlling a free-space optical communication apparatus, the free-space optical communication apparatus comprising:

a light emission section configured to emit light;

an optical phase modulation section configured to adjust a direction of the light emitted by the light emission section; and a light reception section configured to receive light from outside, the method comprising:

a communication control process comprising, by causing the light emission section to emit first communication light to a first adjusted direction and causing the light reception section to receive second communication light from a communication counterpart, carrying out free-space optical communication with the communication counterpart; and a measurement control process comprising measuring a distance to a surrounding object by causing the light emission section to emit pulsed light to a second adjusted direction and causing the light reception section to receive reflected light of the pulsed light, wherein, in the communication control process, by causing the optical phase modulation section to change a first light emission direction of the first communication light, detecting the first light emission direction in which free-space optical communication is possible with the communication counterpart, wherein information indicative of a second light emission direction of the second communication light from the communication counterpart is superimposed on the second communication light, and wherein in the measurement control process, an attitude of the communication counterpart is measured on a basis of the first light emission direction and the second light emission direction.

* * * * *